United States Patent
Kang et al.

(10) Patent No.: US 10,687,265 B2
(45) Date of Patent: Jun. 16, 2020

(54) WIRELESS MESH NETWORK TOPOLOGY MAP MANAGEMENT METHOD BASED ON POSITIONING TECHNIQUE

(71) Applicant: WISTRON NEWEB CORPORATION, Hsinchu (TW)

(72) Inventors: Fu-Ming Kang, Hsinchu (TW); Chui-Chu Cheng, Hsinchu (TW); Horen Chen, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 0 days.

(21) Appl. No.: 16/200,742

(22) Filed: Nov. 27, 2018

(65) Prior Publication Data

US 2020/0100159 A1  Mar. 26, 2020

(30) Foreign Application Priority Data

Sep. 26, 2018 (TW) .............................. 107133826 A (51) Int. Cl.
*H04W 36/22* (2009.01)
*H04L 12/24* (2006.01)
(Continued)

(52) U.S. Cl.
CPC ............. *H04W 36/22* (2013.01); *H04L 41/12* (2013.01); *H04W 16/18* (2013.01);
(Continued)

(58) Field of Classification Search
CPC ............. H04W 4/023; H04W 52/0216; H04W 52/0254; H04W 64/00; H04W 88/08;
(Continued)

(56) References Cited

U.S. PATENT DOCUMENTS 7,349,702 B2 * 3/2008 Graumann .............. G01S 1/042
370/328
7,353,028 B2 * 4/2008 Fukuhara .............. H04W 36/30
370/331
(Continued)

FOREIGN PATENT DOCUMENTS

| CN | 102158812 B | 7/2013 |
|---|---|---|
| CN | 103197280 B | 12/2014 |
| WO | 2005064855 A1 | 7/2005 |
| WO | 2008033514 A2 | 3/2008 |

*Primary Examiner* — Man U Phan
(74) *Attorney, Agent, or Firm* — McClure, Qualey & Rodack, LLP (57) ABSTRACT

A wireless mesh network topology map management method includes: deploying a main AP and a first AP; establishing a connection between the first AP and the main AP; executing a positioning procedure to obtain a first coordinate of the first AP relative to the main AP; deploying a second AP; establishing a connection between the second AP and one of the main AP and the first AP; executing the positioning procedure to obtain a second coordinate of the second AP relative to the main AP; establishing a wireless mesh network topology map based on the first and second coordinates; and controlling the second AP to establish a connection with one of the main AP and the first AP that has the shortest distance relative to the second AP based on the wireless mesh network topology map.

19 Claims, 8 Drawing Sheets

(51) Int. Cl.
*H04W 64/00* (2009.01)
*H04W 76/18* (2018.01)
*H04W 36/00* (2009.01)
*H04W 16/18* (2009.01)
*H04W 84/12* (2009.01)

(52) U.S. Cl.
CPC ..... *H04W 36/0072* (2013.01); *H04W 64/003* (2013.01); *H04W 76/18* (2018.02); *H04W 84/12* (2013.01)

(58) Field of Classification Search
CPC .. H04W 24/04; H04W 88/10; H04L 12/1863; H04L 12/189; H04L 29/04; H04L 69/24; G01R 31/08; G01S 19/42; G01S 3/14; G01S 3/46
USPC .................................................. 370/225, 312
See application file for complete search history.

(56) References Cited

U.S. PATENT DOCUMENTS

| | | | |
|---|---|---|---|
| 7,522,540 B1* | 4/2009 | Maufer | H04L 45/18 370/254 |
| 7,924,727 B2* | 4/2011 | MacDonald | H04W 84/18 370/238 |
| 8,565,788 B2* | 10/2013 | Houri | G01S 5/0263 455/414.1 |
| 9,526,061 B2* | 12/2016 | Jing | H04L 12/2807 |
| 9,642,073 B2* | 5/2017 | Padden | H04W 36/00 |
| 9,689,955 B2* | 6/2017 | Rosenbaum | G01S 3/46 |
| 9,807,683 B2* | 10/2017 | Padden | H04W 36/00 |
| 2007/0161371 A1* | 7/2007 | Dobrowski | H04L 41/12 455/423 |
| 2014/0148195 A1 | 5/2014 | Bassan-Eskenazi et al. | |
| 2014/0321325 A1 | 10/2014 | Jing et al. | |
| 2019/0029072 A1* | 1/2019 | Zhu | H04W 88/06 |
| 2019/0037419 A1* | 1/2019 | Knaappila | H04W 24/02 |
| 2019/0086505 A1* | 3/2019 | Malik | H04L 69/22 |

* cited by examiner

WIRELESS MESH NETWORK TOPOLOGY MAP MANAGEMENT METHOD BASED ON POSITIONING TECHNIQUE

CROSS-REFERENCE TO RELATED PATENT APPLICATION

This application claims the benefit of priority to Taiwan Patent Application No. 107133826, filed on Sep. 26, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a wireless mesh network topology map management method; more particularly, to a wireless mesh network topology map management method based on positioning technique.

BACKGROUND OF THE DISCLOSURE

With the recent popularity of mobile electronic devices such as tablets, laptops, and cellphones, wireless network systems are deployed in numerous places including public spaces so as to provide telecommunication and Wi-Fi services for mobile electronic devices. However, with widening of the range of signal coverage, signal degradation and signal instability may frequently occur due to signal interference and signal blocking by the terrain or obstacles. Generally, wireless routers having multiple antennas therein and being able to transmit signal waves with stronger power can meet usage requirements in an indoor environment where the wireless network system is deployed such as a home or small office. Nevertheless, as the range of signal coverage is getting wider and more mobile electronic devices are connected to the wireless network system at the same time, the problems of slow signal transmission speed, network traffic jam, and even network disconnection may occur.

In order to solve the aforesaid problems, one of the frequently-used conventional ways is to use a Wi-Fi extender to enlarge the range of signal coverage. However, the Wi-Fi extender occupies the frequency band resulting in a speed loss of the Wi-Fi network. In addition, for the user, the settings required in the two conventional ways result in a more complicated process than simply using a single wireless router.

Consequently, the Wi-Fi mesh network system is introduced and developed to solve the above-mentioned issues. Specifically, the Wi-Fi mesh network system is a local network topology in which the infrastructure nodes (i.e. bridges, switches and other infrastructure devices) connect directly, dynamically and non-hierarchically to other nodes as many as possible and cooperate with the nodes to efficiently route data from/to clients. The Wi-Fi mesh networks are dynamically self-organized and self-configured, so that the installation of the Wi-Fi mesh network can be simplified. The capability of self-configuration enables dynamic distribution of workloads of the Wi-Fi mesh network system. In other words, the Wi-Fi mesh network system can improve quality of connection via an easier setting process.

However, in the Wi-Fi mesh network system, the deployments of connection, disconnection, and reconnection among the mobile electronic device and access points (APs) are based on received signal strength indication (RSSI). Even if the conventional RSSI is reliable, three major problems may stem therefrom. Firstly, if the mobile electronic devices are too obsolete to support 802.11k protocols, measured signal strength will be unable to be reported. Secondly, the time spent on monitoring the connection quality of the mobile electronic devices may be influenced by at least one of the time for measuring the signal strength, amounts of the neighboring APs, and amounts of the connecting mobile electronic devices or potential mobile electronic devices, which would incur delay of switching Wi-Fi connection (hand-off). Thirdly, the mobile electronic devices may not always respond to the request of the RSSI, especially when the mobile electronic devices are busy.

SUMMARY OF THE DISCLOSURE

In response to the above-referenced technical inadequacies, the present disclosure provides a wireless mesh network topology map management method based on positioning technique.

In one aspect, the wireless mesh network topology map management method includes the steps of: deploying a main access point (AP) and a first AP for establishing a wireless mesh network; establishing a connection between the first AP and the main AP; executing, by the main AP, a positioning procedure to obtain first position information of the first AP, and storing the first position information in the main AP, wherein the first position information at least includes a first coordinate; deploying a second AP into the wireless mesh network; establishing a connection between the second AP and one of the main AP and the first AP; executing, by the first AP, the positioning procedure to obtain second position information of the second AP, and transmitting the second position information to the main AP when the second AP establishes a connection with the first AP, wherein the second position information at least includes a relative coordinate of the second AP relative to the first AP, and wherein the relative coordinate is converted into a second coordinate the second AP relative to the main AP, and the second coordinate is stored in the main AP; executing, by the main AP, the positioning procedure to obtain second position information of the second AP, and storing the second position information in the main AP when the second AP establishes a connection with the main AP, wherein the second position information at least includes the second coordinate the second AP relative to the main AP; establishing, by the main AP, a wireless mesh network topology map based on the first position information and the second position information; determining, by the main AP, whether the main AP or the first AP has the shortest distance relative to the second AP based on the wireless mesh network topology map; and controlling, by the main AP, the second AP to establish a connection with one of the main AP and the first AP that has the shortest distance relative to the second AP.

In another aspect, a wireless mesh system is provided and includes a main access point (AP), a first AP, and a second AP, where the main AP is configured to: establish a connection with the first AP; execute a positioning procedure to obtain and store first position information of the first AP; establish a connection with the second AP or between the first AP and second AP, in response to a connection established between the second AP and the first AP, the main AP obtains second position information of the second AP from the first AP executing the positioning procedure, wherein the second position information at least includes a relative coordinate of the second AP relative to the first AP, and the relative coordinate is converted into a second coordinate of the second AP relative to the main AP to be stored in the main AP; in response to a connection established between the second AP and the main AP, the main AP executes the positioning procedure to obtain second position information of the second AP, and stores the second position information therein, wherein the second position information at least includes the second coordinate of the second AP relative to the main AP; establish a wireless mesh network topology map based on the first position information and the second position information; determine whether the main AP or the first AP has the shortest distance relative to the second AP based on the wireless mesh network topology map; and establish a connection between the second AP and one of the main AP and the first AP that has the shortest distance relative to the second AP.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figures 1, 1B:
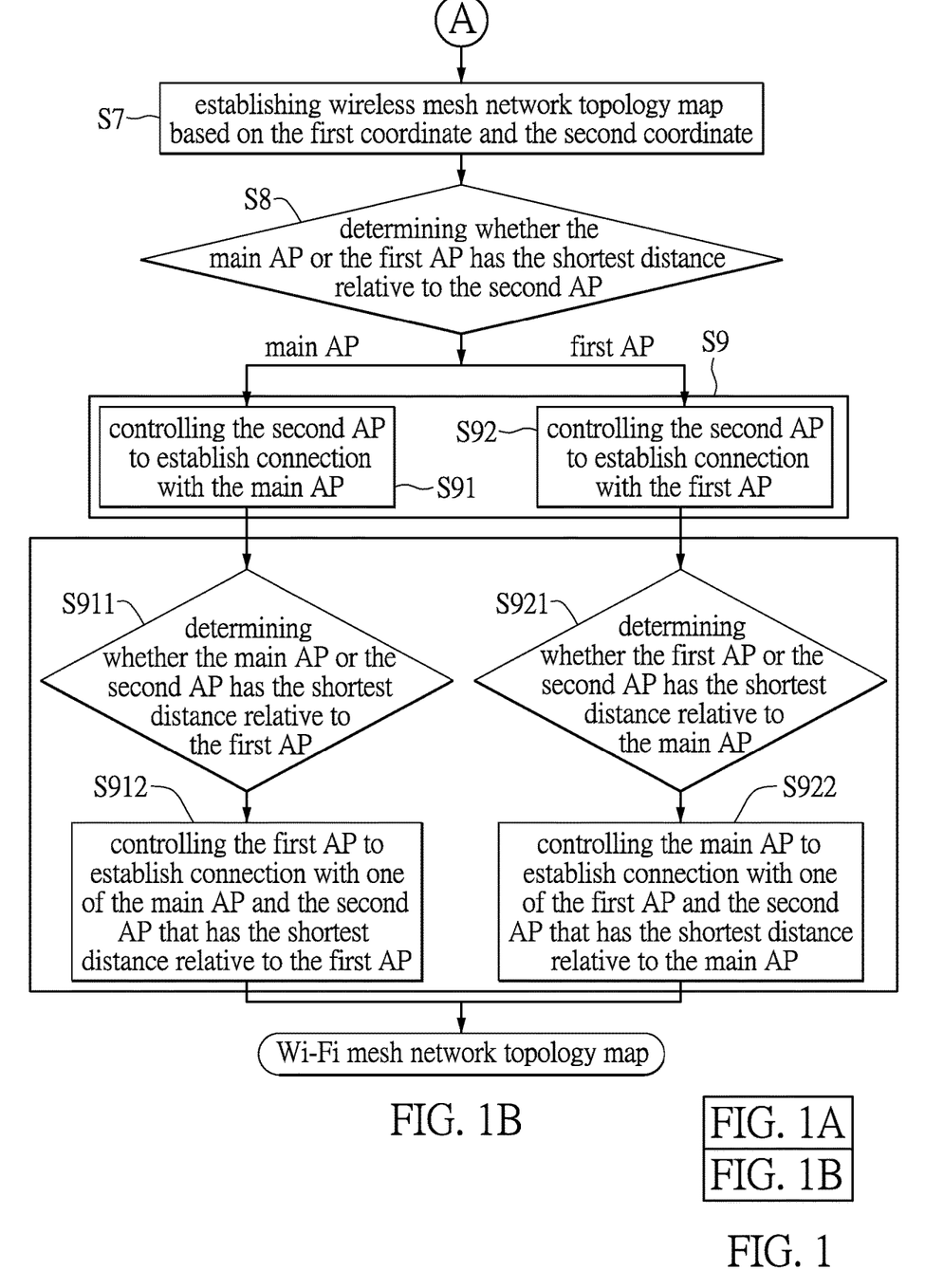
FIG. 1A and FIG. 1B are flow charts of a wireless mesh network topology map management method based on positioning technique according to an embodiment of the present disclosure, demonstrating a deployment of the wireless mesh network topology map management method based on positioning technique.

Referring to FIG. 1 (FIG. 1A and FIG. 1B), a flow chart of is shown illustrating an example of deploying a wireless mesh network topology map management method based on positioning technique according to an embodiment of the present disclosure. The wireless mesh network topology map management method includes the following steps.

Figure 1A:
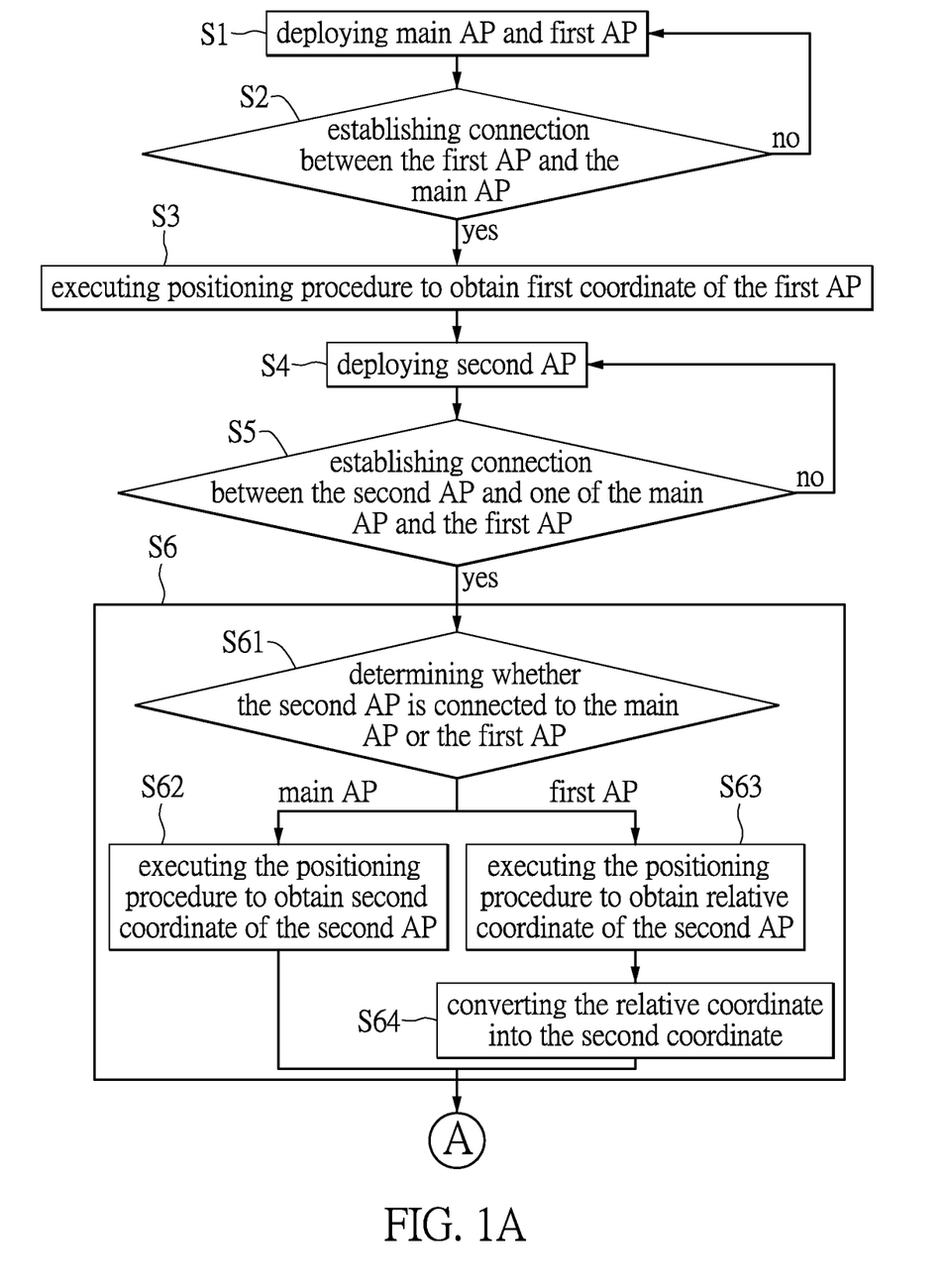

Step S1: deploying a main access point (AP) and a first AP for establishing a wireless mesh network. The two positions for deploying the main AP and the first AP are configured according to user preferences. In some embodiments, the positions for placing the main AP and the first AP can be preliminarily selected based on RSSI as well. In order to maintain a strong and stable connection between the main AP and the first AP, the two positions should not be too far away from one another. Moreover, if an excessive amount of signal-blocking objects (e.g., the walls) exist between the main AP and the first AP, the connection between the main AP and the first AP cannot be established. Specifically, a control device (e.g., a touch panel, not shown in figures) of the user is connected to the main AP such that the user can remotely control the wireless mesh network via the control device.

Step S2: establishing a connection between the first AP and the main AP. The main AP in this step further determines whether the connection is successfully established. If the connection is successfully established, the next step will be executed. If the connection is not successfully established, the main AP generates a connection failure message and displays the message on the control device for notifying the user. Then, the previous Step S1 is executed again, where at least one of the main AP and the first AP is re-deployed until the connection therebetween is successfully established. For example, one of the major reasons causing the failure of connection is that the distance between the main AP and the first AP is too far.

Step S3: executing, by the main AP, a positioning procedure to obtain first position information of the first AP, and storing the first position information in the main AP, wherein the first position information at least includes a first coordinate. Specifically, the positioning procedure includes at least one of the positioning methods of: Angle of Arrival (AoA); Time of Flight (ToF); Received Signal Strength Indication (RSSI); Channel State Information (CSI); signal fingerprinting based on RSSI or CSI. However, the present application is not limited thereto.

Specifically, the AoA positioning method is achieved by using directional antennas or antenna arrays. Through the AoA positioning method, the location of the APs is estimated from the intersection of several pairs of angle direction lines (of signal transmission) by determining the angle of incidence at which signals arrive at the receiving sensor. Moreover, the ToF positioning method can obtain the distance between the main AP and the first AP by calculating the transmission speed of signals and time of the signal transmission. In this embodiment, by applying both the positioning methods of AoA and ToF, accurate positioning of the first AP relative to the main AP can be achieved. It is understood that in other embodiment of the present application, the positioning methods of RSSI and CSI could also be applicable in positioning the APs to improve accuracy thereof. The present application should not be limited to a particular one or any combination of the positioning methods.

Figure 2A:
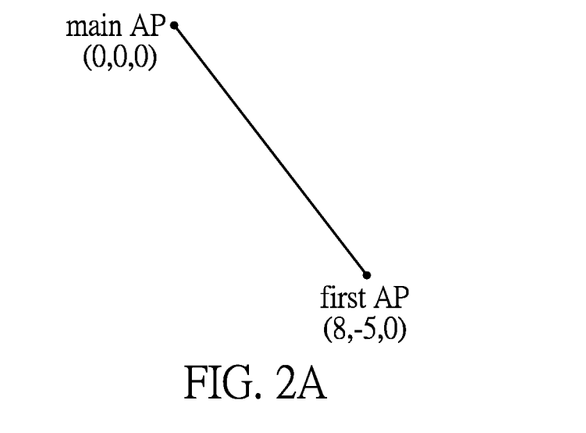
FIG. 2A is a schematic view of connections among access points (APs) of the wireless mesh network topology map management method based on positioning technique according to the present disclosure.

It is noted that the main AP is configured to be a center of the coordinate system (i.e., x, y, z=0, 0, 0) of the wireless mesh network topology map. According to the position of the first AP relative to that of the main AP, the coordinate of the first AP (e.g., 8, −5, 0) can be generated and stored in the main AP, as shown in FIG. 2A.

Step S4: deploying a second AP into the wireless mesh network. Similarly, the position for deploying the second AP is based on user preferences. In order to maintain a strong and stable connection between the second AP and one of the main AP and the first AP, the position of the second AP should not be too far away from either the main AP or the first AP. Moreover, if an excessive amount of signal-blocking objects (e.g., the walls) lie between the second AP and one of the main AP and the first AP, the connection between the second AP and one of the main AP and the first AP cannot be established.

Step S5: establishing the connection between the second AP and one of the main AP and the first AP. Similarly, the main AP in this step further determines whether the connection is successfully established. If the connection is successfully established, the next step will be executed; if the connection is not successfully established, the main AP generates the connection failure message and displays the message on the control device for notifying the user. Then, the previous Step S4 is executed again, where the second AP is re-deployed until the connection between the second AP and at least one of the main AP and the first AP is successfully established. For example, one of the major reasons causing the failure of connection is that the distances between the second AP and the main AP and the first AP are too far.

Step S6: executing, by the first AP, the positioning procedure to obtain second position information of the second AP. Step S6 includes the steps of Step 61 to Step 64.

Figure 2B:
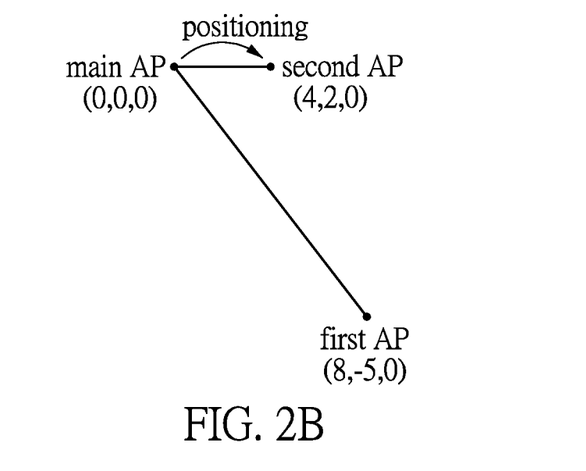
FIG. 2B is a schematic view of connections among access points (APs) of the wireless mesh network topology map management method based on positioning technique according to the present disclosure.

Step 61: determining whether the second AP is connected to the main AP or the first AP. If the second AP is connected to the main AP, as shown in FIG. 2B, the wireless mesh network topology map management method proceeds to Step S62. If the second AP is connected to the first AP, as shown in FIG. 2C, the wireless mesh network topology map management method proceeds to Step S63 and Step S64.

Step S62: referring to FIG. 2B, when the second AP establishes a connection with the main AP, the main AP executes the positioning procedure to obtain second position information of the second AP and stores the second position information in the main AP. The second position information at least includes the second coordinate (e.g., 4, 2, 0) of the second AP relative to the main AP.

Figure 2C:
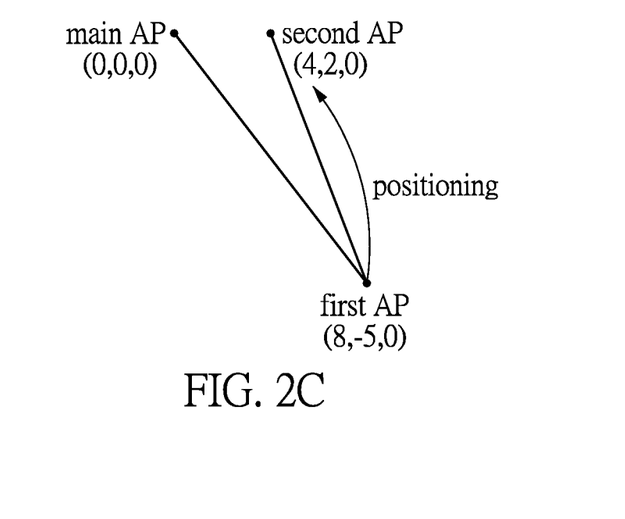
FIG. 2C is a schematic view of connections among access points (APs) of the wireless mesh network topology map management method based on positioning technique according to the present disclosure.

Step S63: referring to FIG. 2C, when the second AP establishes a connection with the first AP, the first AP executes the positioning procedure to obtain the second position information of the second AP and transmits the second position information to the main AP. The second position information at least includes a relative coordinate (e.g., −4, 7, 0) of the second AP relative to the first AP.

Step S64: the main AP converts the relative coordinate (e.g., −4, 7, 0) into a second coordinate (e.g., 4, 2, 0) of the second AP relative to the main AP, and the second coordinate is stored in the main AP. Since the relative coordinate is the coordinate where the second AP is relative to the first AP in position, it is required to be converted into the coordinate where the second AP is relative to the center (i.e., the main AP) of the coordinate system in position.

Step S7: establishing, by the main AP, a wireless mesh network topology map based on the first position information and the second position information. As mentioned above, the wireless mesh network topology map is presented by the coordinate system in which the main AP is located in the center.

Step S8: determining, by the main AP, whether the main AP or the first AP has the shortest distance relative to the second AP based on the wireless mesh network topology map.

Step S9: controlling, by the main AP, the second AP to establish a connection with one of the main AP and the first AP that has the shortest distance relative to the second AP. Step S9 includes two possible situations. When the second AP is closer to the main AP than the first AP, the wireless mesh network topology map management method proceeds to Step S91: controlling the second AP to establish a connection with the main AP. On the other hand, when the second AP is closer to the first AP than the main AP, the wireless mesh network topology map management method proceeds to Step S92: controlling the second AP to establish a connection with the first AP. In other words, in Step S9, the wireless mesh network topology map according to the present application optimizes the connection of the second AP.

Figure 2D:
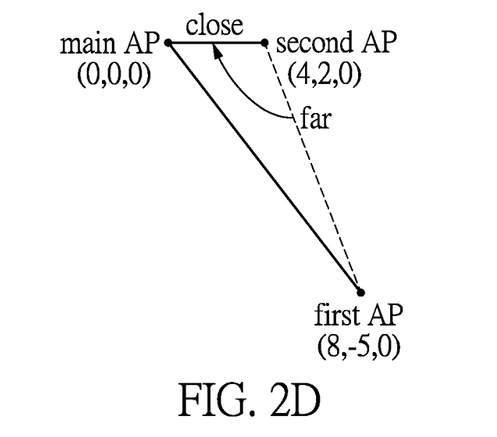
FIG. 2D is a schematic view of connections among access points (APs) of the wireless mesh network topology map management method based on positioning technique according to the present disclosure.

It should be understood that, even if the second AP is connected to the first AP (as shown in FIG. 2C), with the determination that the second AP is closer to the main AP than the first AP based on the wireless mesh network topology map, the main AP switches the second AP from connecting the first AP to connecting the main AP, as shown in FIG. 2D.

Figure 2E:
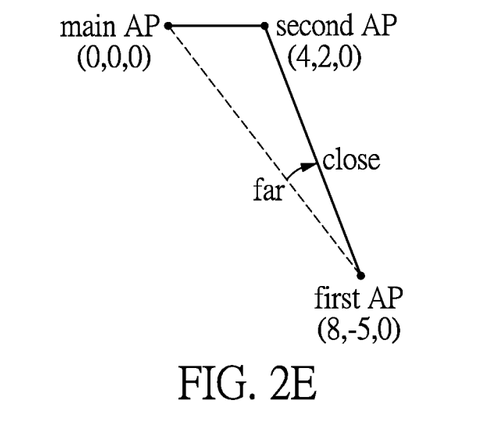
FIG. 2E is a schematic view of connections among access points (APs) of the wireless mesh network topology map management method based on positioning technique according to the present disclosure.

In Step S91, when the second AP establishes a connection with the main AP, the method further includes: Step S911: determining, by the main AP, whether the main AP or the second AP has the shortest distance relative to the first AP based on the wireless mesh network topology map; and Step S912: controlling, by the main AP, the first AP to establish a connection with one of the main AP and the second AP that has the shortest distance relative to the first AP. In other words, the wireless mesh network topology map according to the present application not only optimizes the connection of the new-added AP (i.e., the second AP) but also optimizes the connection of the remaining AP(s), specifically the first AP in Steps S911 and 912. Referring to FIG. 2D, the second AP has the shortest distance relative to the first AP, and thus the main AP controls the first AP to establish the connection with the second AP, as shown in FIG. 2E.

In Step S92, when the second AP establishes a connection with the first AP, the method further includes: Step S921: determining, by the main AP, whether the first AP or the second AP has the shortest distance relative to the main AP based on the wireless mesh network topology map; and Step S922: controlling, by the main AP, the main AP to establish a connection with one of the first AP and the second AP that has the shortest distance relative to the main AP. In other words, the wireless mesh network topology map according to the present application not only optimizes the connection of the newly-added AP (i.e., the second AP) but also optimizes the connection of the remaining AP(s), specifically the main AP in Steps S921 and 922.

Figure 3:
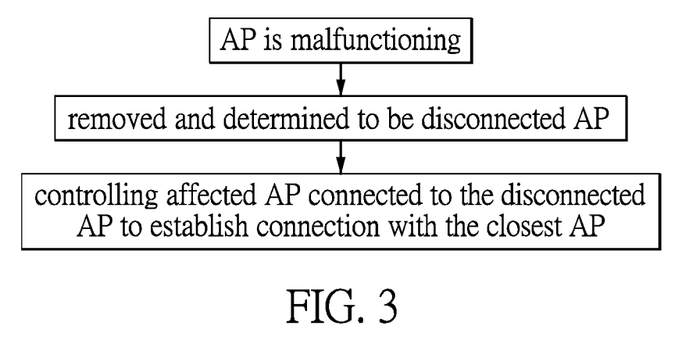
FIG. 3 is a flow chart of the wireless mesh network topology map management method based on positioning technique according to another embodiment of the present disclosure, demonstrating a solution for malfunction of the AP.

Moreover, the wireless mesh network topology map further includes a function of re-establishing the wireless mesh network topology map when at least one of the APs is malfunction or disabled. Referring to FIG. 3, when the first AP is malfunction, the first AP is removed from the wireless mesh network topology map and is determined as a disconnected AP. Then, the main AP controls at least one affected AP(s) that is previously connected to the disconnected AP and that is affected by malfunction of the disconnected AP to establish a connection with one of the main AP and the second AP that has the shortest distance relative to the affected AP based on the wireless mesh network topology map.

Similarly, when the second AP is malfunction, the second AP is removed from the wireless mesh network topology map and is determined to be a disconnected AP. Then, the main AP controls at least one affected AP(s) that is previously connected to the disconnected AP and that is affected by malfunction of the disconnected AP to establish a connection with one of the main AP and the first AP that has the shortest distance relative to the affected AP based on the wireless mesh network topology map. The malfunction of the AP(s) may be caused by disconnection of the AP, electrical power failure, broken AP, being removed or shut down by the user. By virtue of the wireless mesh network topology map of the present application, the user can easily locate the malfunctioning AP or disconnected AP via the information displayed on the control device. Furthermore, the wireless mesh network topology map of the present application can be automatically re-established by itself.

It is understood that although there are only three APs depicted herein in regard with the wireless mesh network topology map of the present disclosure, the number of APs used is not limited thereto. Specifically, the wireless mesh network topology map of the present application can be further developed regarding adding AP(s), removing AP(s), optimizing connection and automatically re-establishing.

Figure 4:
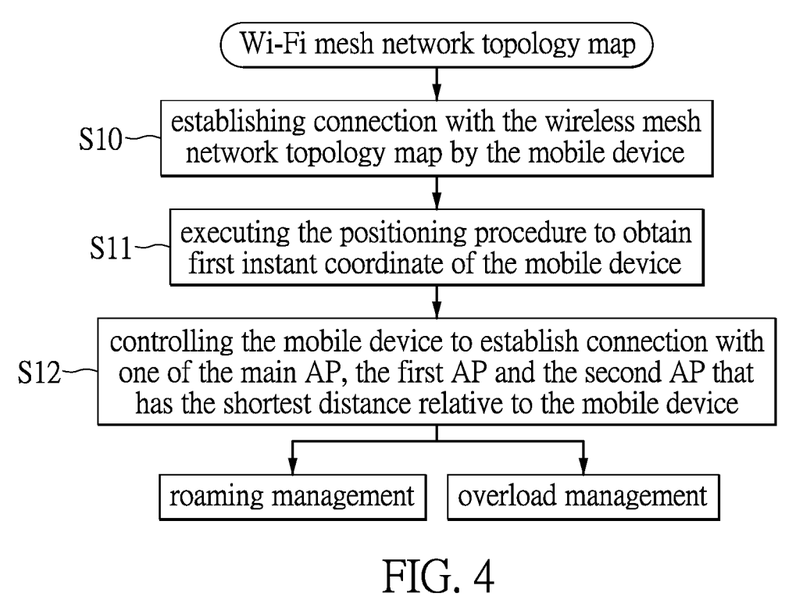
FIG. 4 is a flow chart of the wireless mesh network topology map management method based on positioning technique according to yet another embodiment of the present disclosure, demonstrating connections between clients and the APs.

Referring to FIG. 4, after the wireless mesh network topology map is deployed, the method proceeds to the connection management between the client(s) (i.e., the mobile devices) and the wireless mesh network topology map.

Step S10: establishing, by the mobile device, a connection with the wireless mesh network topology map.

Step S11: executing the positioning procedure to obtain first mobile information of the mobile device, and storing the first mobile information in the main AP, wherein the first mobile information at least includes a first instant coordinate in the wireless mesh network topology map. Specifically, the positioning procedure includes at least one of the positioning methods of AoA, ToF, RSSI, and CSI. The detailed description is demonstrated above and thus the detailed description is omitted for sake of brevity. It is noted that the first instant coordinate is the position of the mobile device relative to that of the main AP.

Step S12: controlling, by the main AP, the mobile device to establish a connection with one of the main AP, the first AP and the second AP that has the shortest distance relative to the mobile device based on the first instant coordinate and the wireless mesh network topology map. It is noted that even if the mobile device is connected to the first AP, however, the mobile device is closer to the second AP than the first AP instead, based on the wireless mesh network topology map, the main AP switches the connection of the mobile device from the first AP to the second AP, The following embodiments are advanced implementations of the wireless mesh network topology map management method according to the present application, including roaming management (the first embodiment) and overload management (the second embodiment).

First Embodiment

The first embodiment of the wireless mesh network topology map management method is related to the roaming management of the clients (mobile devices).

Figure 5:
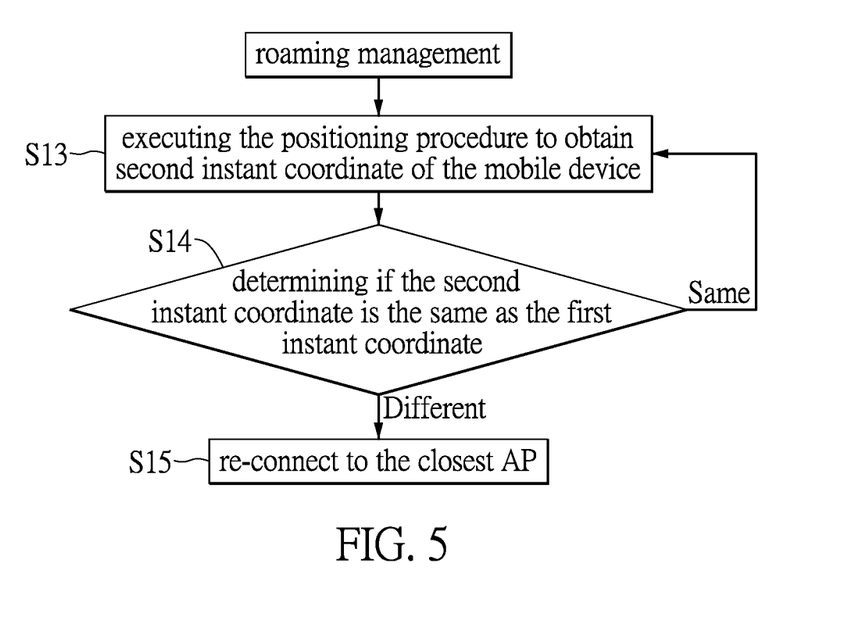
FIG. 5 is a flow chart of the wireless mesh network topology map management method based on positioning technique according to the yet another embodiment of the present disclosure, demonstrating connections for roaming of the clients.

Referring to FIG. 5, after Step S12 is executed, the wireless mesh network topology map management method proceeds to Step S13: executing the positioning procedure to obtain a second instant coordinate of the first mobile information of the mobile device.

Step S14: if the second instant coordinate is the same as the first instant coordinate, which represents that the client (mobile device) does not move, the wireless mesh network topology map management method goes back to the previous Step S13 after a predetermined period of time.

Step S15: However, if the second instant coordinate is different from the first instant coordinate, which represents that the client (mobile device) is moving, the main AP controls the mobile device to establish a connection with one of the main AP, the first AP and the second AP that has the shortest distance relative to the mobile device based on the second instant coordinate (the updated instant coordinate) and the wireless mesh network topology map.

Figure 6:
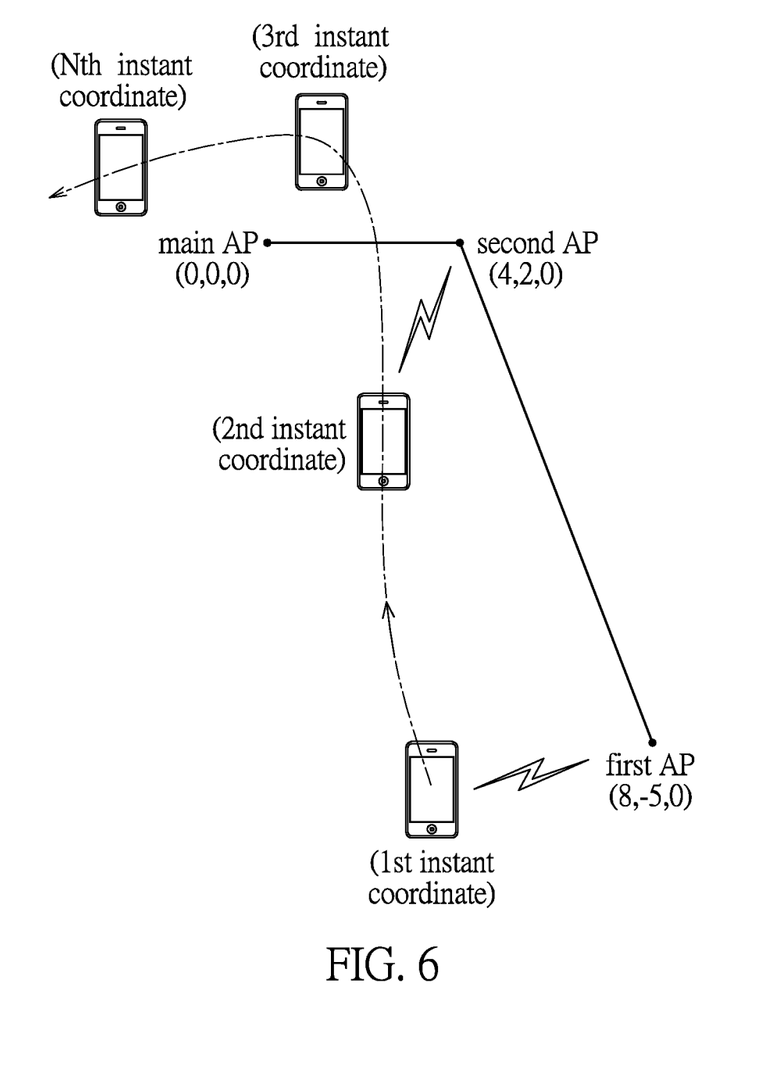
FIG. 6 is a schematic view of FIG. 5 according to the present disclosure.

For example, referring to FIG. 6, if the mobile device (in the first instant coordinate) is connected to the first AP, since the client (mobile device) is moving to the second coordinate that is closer to the second AP than the first AP based on the wireless mesh network topology map, the main AP controls the mobile device to establish a connection with the second AP that has the shortest distance relative to the mobile device.

Second Embodiment

The first embodiment of the wireless mesh network topology map management method is related to the overload management of the clients (mobile devices).

Figure 7:
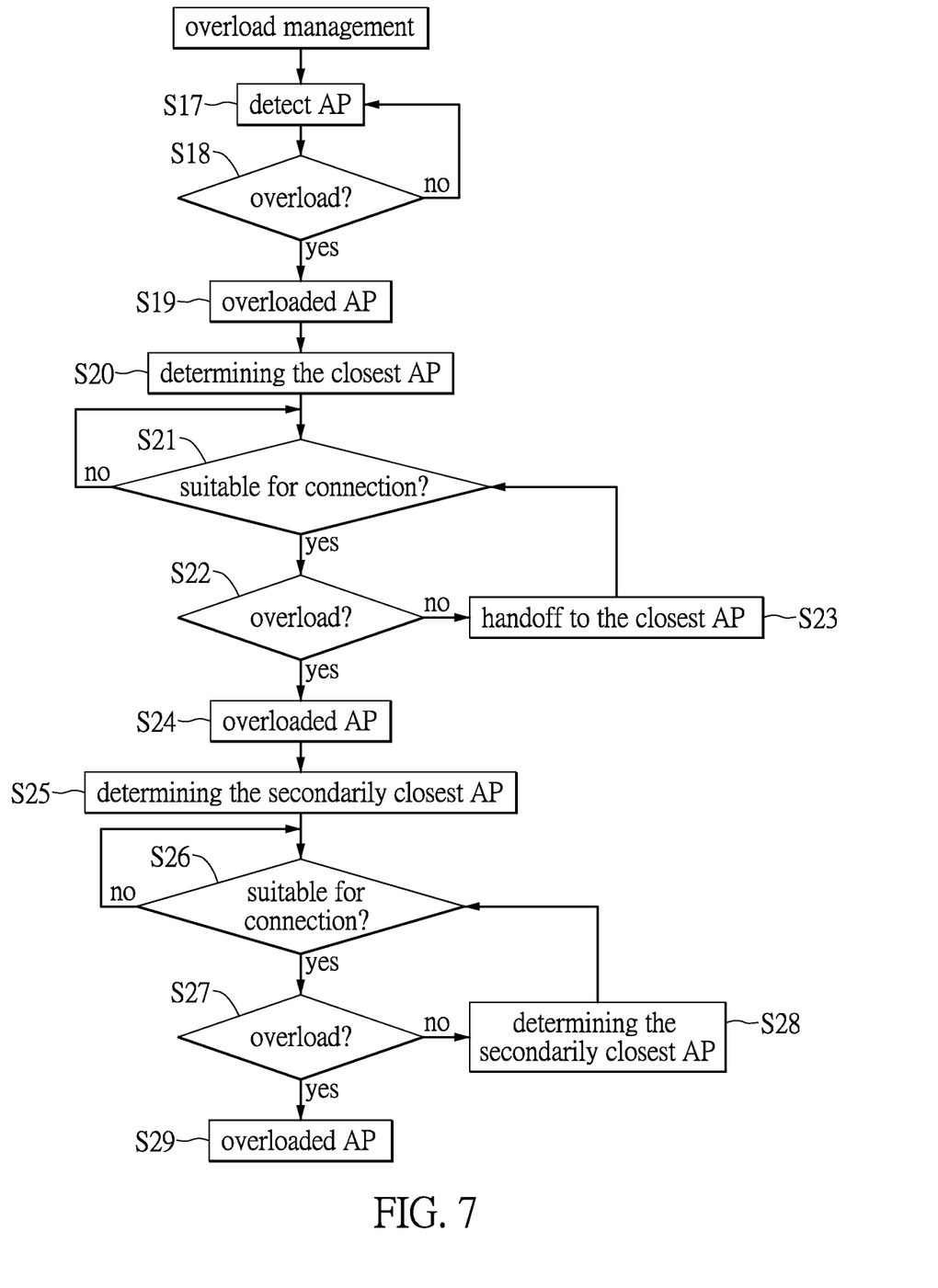
FIG. 7 is a flow chart of the wireless mesh network topology map management method based on positioning technique according to the yet another embodiment of the present disclosure, demonstrating a solution for overload of the APs.

Referring to FIG. 7, after Step S12 is executed, the wireless mesh network topology map management method proceeds to Step S17: periodically detecting the loadings of the main AP, the first AP and the second AP. Step S18: determining, by the main AP, whether any of the main AP, the first AP and the second AP is overloaded. Step S19: if any one or ones of the main AP, the first AP and the second AP is overloaded, the overloaded one or ones of the main AP, the first AP and the second AP is determined to be an overloaded AP. If the main AP, the first AP and the second AP are not overloaded, the wireless mesh network topology map management method goes back to the previous Step S17: periodically detecting the loadings of the main AP, the first AP and the second AP.

In response to Step S19, the main AP executes Step S20: determining, by the main AP, one of the main AP, the first AP and the second AP that has the shortest distance relative to a first overloaded AP of the overloaded AP to be a closest AP based on the wireless mesh network topology map. Step S21: determining, by the main AP, whether the closest AP is suitable for connection with the mobile devices that are connected to the first overloaded AP. If the closest AP is suitable for connection with the mobile devices that are connected to the first overloaded AP, the wireless mesh network topology map management method proceeds to Step S22. If the closest AP is not suitable for connection with the mobile devices that are connected to the first overloaded AP, the mobile devices maintain the connection with the first overloaded AP. The main AP may determines whether the closest AP is suitable for connection with the mobile devices based on distance between the closest AP and the mobile device or the signal strength of connection, for instance, RSSI, between the closest AP and the mobile device.

Step S22: determining, by the main AP, whether the closest AP is overloaded. If the closest AP is not overloaded, the wireless mesh network topology map management method proceeds to Step S23: executing, by the main AP, a handoff procedure to handoff (switch) the mobile device from connecting the first overloaded AP to connecting the closest AP. If the closest AP is determined to be overloaded, the wireless mesh network topology map management method executes Step S24: determining the closest AP to be a second overloaded AP. Step S25: determining, by the main AP, one of the main AP, the first AP and the second AP that has the secondarily shortest distance relative to the first overloaded AP to be a secondarily closest AP based on the wireless mesh network topology map. Step S26: determining, by the main AP, whether the secondarily closest AP is suitable for connection with the mobile devices that are connected to the first overloaded AP. If affirmative, the wireless mesh network topology map management method proceeds to Step S27. Otherwise, the mobile devices maintain the connection with the first overloaded AP.

Step S27: determining, by the main AP, whether the secondarily closest AP is overloaded. If the secondarily closest AP is not overloaded, the wireless mesh network topology map management method proceeds to Step S28: executing, by the main AP, the handoff procedure to handoff (switch) the mobile device from connecting the first overloaded AP to connecting the secondarily closest AP. Similarly, if the secondarily closest AP is determined to be overloaded, the wireless mesh network topology map management method executes Step S29: determining the secondarily closest AP to be a third overloaded AP. Then, the main AP determines one of the main AP, the first AP and the second AP that has the thirdly shortest distance relative to the first overloaded AP to be a thirdly closest AP based on the wireless mesh network topology map. That is to say, the method will be continually executed until a non-overloaded AP is found.

After the loading of the first overloaded AP is divided to other AP(s), the wireless mesh network topology map management method executes the overload management to deal with a second overloaded AP and a third overloaded AP if needed.

It is understood that whether the AP is overloaded is determined based on whether an amount of data transmission exceeds a predetermined amount of data transmission. For instance, if the amount of data transmission of the first AP exceeds the predetermined amount of data transmission, the first AP is determined to be the overloaded AP. Whether the AP is overloaded can also be determined based on whether an amount of mobile devices connected to the AP exceeds a predetermined amount, or based on whether an instantaneous data transmission exceeds a predetermined amount of instantaneous data transmission. The present application should not be limited to the abovementioned methods of determination.

In conclusion, the wireless mesh network topology map management method of the present application is able to optimize the connection and re-establish the wireless mesh network topology map based on the coordinates, which greatly improves the speed of connection switching among the APs and improves the management of the wireless mesh network topology map. Moreover, the wireless mesh network topology map management method further optimizes the connections between the mobile devices and the APs based on the coordinates such that the handoff procedure does not need to wait for the report of the RSSI positioning method. Furthermore, if any of the APs of the wireless mesh network topology map is overloaded, the wireless mesh network topology map management method is able to divide the loading of the transmission, thereby optimizing the wireless mesh network topology map.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A wireless mesh network topology map management method based on positioning technique, comprising the steps of:
    S1: deploying a main access point (AP) and a first AP for establishing a wireless mesh network;
    S2: establishing a connection between the first AP and the main AP;
    S3: executing, by the main AP, a positioning procedure to obtain first position information of the first AP, and storing the first position information in the main AP, wherein the first position information at least includes a first coordinate;
    S4: deploying a second AP into the wireless mesh network;
    S5: establishing a connection between the second AP and one of the main AP and the first AP;
    S6: in response to a connection established between the second AP and the first AP, the first AP executing the positioning procedure to obtain second position information of the second AP, and transmitting the second position information to the main AP, wherein the second position information at least includes a relative coordinate of the second AP relative to the first AP, and the relative coordinate is converted into a second coordinate of the second AP relative to the main AP to be stored in the main AP; in response to a connection established between the second AP and the main AP, the main AP executing the positioning procedure to obtain second position information of the second AP, and storing the second position information in the main AP, wherein the second position information at least includes the second coordinate of the second AP relative to the main AP;
    S7: the main AP establishing a wireless mesh network topology map based on the first position information and the second position information;
    S8: the main AP determining whether the main AP or the first AP has the shortest distance relative to the second AP based on the wireless mesh network topology map;
    S9: the main AP establishing a connection between the second AP and one of the main AP and the first AP that has the shortest distance relative to the second AP;
    S10: establishing a connection between a mobile device and the wireless mesh network topology map;
    S11: executing the positioning procedure to obtain first mobile information of the mobile device, and storing the first mobile information in the main AP, wherein the first mobile information at least includes a first instant coordinate in the wireless mesh network topology map; and
    S12: the main AP establishing a connection between the mobile device and one of the main AP, the first AP and the second AP that has the shortest distance relative to the mobile device based on the first instant coordinate in the wireless mesh network topology map.

2. The wireless mesh network topology map management method according to claim 1, wherein in step S9, in response to a connection established between the second AP and the main AP, the method further comprises:
    S911: the main AP determining whether the main AP or the second AP has the shortest distance relative to the first AP based on the wireless mesh network topology map; and
    S912: the main AP establishing a connection between the first AP and one of the main AP and the second AP that has the shortest distance relative to the first AP.

3. The wireless mesh network topology map management method according to claim 1, wherein in step S9, in response to a connection established between the second AP and the first AP, the method further comprises:
    S921: the main AP determining whether the first AP or the second AP has the shortest distance relative to the main AP based on the wireless mesh network topology map; and
    S922: the main AP establishing a connection between the main AP and one of the first AP and the second AP that has the shortest distance relative to the main AP.

4. The wireless mesh network topology map management method according to claim 1, the positioning procedure comprising positioning methods of Angle of Arrival (AoA), Time of Flight (ToF), Received Signal Strength Indication (RSSI), Channel State Information (CSI), signal fingerprinting based on RSSI, signal fingerprinting based on CSI, or the combinations thereof.

5. The wireless mesh network topology map management method according to claim 1, step S2 further comprising:
    the main AP determining whether the connection between the first AP and the main AP is successfully established, in response to determining that the connection is successfully established, proceeding to step S3; and in response to determining that the connection is not successfully established, the main AP generating a first connection failure information and re-executing step S1.

6. The wireless mesh network topology map management method according to claim 1, step S5 further comprising:
    the second AP determining whether the connection between the second AP and one of the first AP and the main AP is successfully established, in response to determining that the connection is successfully established, proceeding to step S6; and in response to determining that the connection is not successfully established, the second AP generating a second connection failure information and re-executing step S4.

7. The wireless mesh network topology map management method according to claim 1, further comprising:
    determining whether the first AP and the second AP are disconnected;
    in response to determining that the first AP is disconnected, the first AP is removed from the wireless mesh network topology map;
    in response to determining that the second AP is disconnected, the second AP is removed from the wireless mesh network topology map;
    wherein the main AP controls an affected AP previously connected to the disconnected AP to establish a connection with one of the main AP, the first AP and the second AP that has the shortest distance relative to the affected AP based on the wireless mesh network topology map.

8. The wireless mesh network topology map management method according to claim 1, further comprising:
    executing the positioning procedure to obtain a second instant coordinate of the first mobile information of the mobile device, and determining whether the second instant coordinate is different from the first instant coordinate, in response to determining that the second instant coordinate is different from the first instant coordinate, the main AP establishes a connection between the mobile device and one of the main AP, the first AP and the second AP that has the shortest distance relative to the mobile device based on the second instant coordinate in the wireless mesh network topology map.

9. The wireless mesh network topology map management method according to claim 1, further comprising:
the main AP determining whether any of the main AP, the first AP and the second AP is overloaded, in response to determining that at least one of the main AP, the first AP and the second AP is overloaded, the main AP determining one of the main AP, the first AP and the second AP that has the shortest distance relative to the overloaded AP based on the wireless mesh network topology map as a closest AP; and
the main AP determining whether the closest AP is overloaded, and in response to determining that the closest AP is not overloaded, the main AP executing a handoff procedure to change the connection of the mobile device from the overloaded AP to the closest AP.

10. The wireless mesh network topology map management method according to claim 9, further comprising:
in response to determining that the closest AP is overloaded, determining, by the main AP, one of the main AP, the first AP and the second AP that has the secondarily shortest distance relative to the overloaded AP based on the wireless mesh network topology map as a secondarily closest AP; and
determining, by the main AP, whether the secondarily closest AP is overloaded, and in response to determining that the secondarily closest AP is not overloaded, executing, by the main AP, the handoff procedure to change the connection of the mobile device from the overloaded AP to the secondarily closest AP.

11. A wireless mesh system comprising:
a main access point (AP), a first AP, and a second AP, the main AP configured to perform steps of:
establish a connection with the first AP;
executing a positioning procedure to obtain and store first position information of the first AP;
establishing a connection with the second AP or between the first AP and second AP, in response to a connection established between the second AP and the first AP, the main AP obtains second position information of the second AP from the first AP executing the positioning procedure, wherein the second position information at least includes a relative coordinate of the second AP relative to the first AP, and the relative coordinate is converted into a second coordinate of the second AP relative to the main AP to be stored in the main AP; in response to a connection established between the second AP and the main AP, the main AP executes the positioning procedure to obtain second position information of the second AP, and stores the second position information therein, wherein the second position information at least includes the second coordinate of the second AP relative to the main AP;
establishing a wireless mesh network topology map based on the first position information and the second position information;
determining whether the main AP or the first AP has the shortest distance relative to the second AP based on the wireless mesh network topology map;
establishing a connection between the second AP and one of the main AP and the first AP that has the shortest distance relative to the second AP;
establishing a connection between a mobile device and the wireless mesh network topology map;
executing the positioning procedure to obtain first mobile information of the mobile device, and storing the first mobile information in the main AP, wherein the first mobile information at least includes a first instant coordinate in the wireless mesh network topology map; and
establishing a connection between the mobile device and one of the main AP, the first AP and the second AP that has the shortest distance relative to the mobile device based on the first instant coordinate in the wireless mesh network topology map.

12. The wireless mesh system according to claim 11, wherein in response to a connection established between the second AP and the main AP, the main AP is further configured to:
determine whether the main AP or the second AP has the shortest distance relative to the first AP based on the wireless mesh network topology map; and
establish a connection between the first AP and one of the main AP and the second AP that has the shortest distance relative to the first AP.

13. The wireless mesh system according to claim 11, wherein in response to a connection established between the second AP and the first AP, the main AP is further configured to:
determine whether the first AP or the second AP has the shortest distance relative to the main AP based on the wireless mesh network topology map; and
establish a connection between the main AP and one of the first AP and the second AP that has the shortest distance relative to the main AP.

14. The wireless mesh system according to claim 11, the positioning procedure comprising positioning methods of Angle of Arrival (AoA), Time of Flight (ToF), Received Signal Strength Indication (RSSI), Channel State Information (CSI), or the combinations thereof.

15. The wireless mesh system according to claim 11, wherein the main AP is further configured to:
determine whether the first AP and the second AP are disconnected, in response to determining that the first AP is disconnected, the first AP is removed from the wireless mesh network topology map, and in response to determining that the second AP is disconnected, the second AP is removed from the wireless mesh network topology map;
control an affected AP previously connected to the disconnected AP to establish a connection with one of the main AP, the first AP and the second AP that has the shortest distance relative to the affected AP based on the wireless mesh network topology map.

16. The wireless mesh system according to claim 11, wherein the main AP is further configured to:
obtaining first mobile information of a mobile device connected with the wireless mesh network system, wherein the first mobile information at least includes a first instant coordinate in the wireless mesh network topology map.

17. The wireless mesh system according to claim 16, wherein the main AP is further configured to:
obtain a second instant coordinate of the first mobile information of the mobile device, and determine whether the second instant coordinate is different from the first instant coordinate, in response to determining that the second instant coordinate is different from the first instant coordinate, the main AP establishes a connection between the mobile device and one of the main AP, the first AP and the second AP that has the shortest distance relative to the mobile device based on the second instant coordinate in the wireless mesh network topology map.

18. The wireless mesh system according to claim 16, wherein the main AP is further configured to:
   determine whether any of the main AP, the first AP and the second AP is overloaded, in response to determining that at least one of the main AP, the first AP and the second AP is overloaded, the main AP determines one of the main AP, the first AP and the second AP that has the shortest distance relative to the overloaded AP based on the wireless mesh network topology map as a closest AP, and determines whether the closest AP is overloaded, and in response to determining that the closest AP is not overloaded, the main AP executes a handoff procedure to change the connection of the mobile device from the overloaded AP to the closest AP.

19. The wireless mesh system according to claim 18, wherein in response to determining that the closest AP is overloaded, the main AP is further configured to:
   determine one of the main AP, the first AP and the second AP that has the secondarily shortest distance relative to the overloaded AP based on the wireless mesh network topology map as a secondarily closest AP; and
   determine whether the secondarily closest AP is overloaded, and in response to determining that the secondarily closest AP is not overloaded, the main AP executes the handoff procedure to change the connection of the mobile device from the overloaded AP to the secondarily closest AP.

\* \* \* \* \*